United States Patent
Tseng et al.

(10) Patent No.: US 11,553,451 B2
(45) Date of Patent: *Jan. 10, 2023

(54) TWO-WAY SIGNAL POSITIONING METHOD AND TWO-WAY SIGNAL POSITIONING SYSTEM THEREOF

(71) Applicant: Gunitech Corp., Qionlin Township, Hsinchu County (TW)

(72) Inventors: Yu-Chee Tseng, Qionlin Township (TW); Ting-Hui Chiang, Qionlin Township (TW); Huai-Wei Peng, Qionlin Township (TW); Chien-Ju Hung, Qionlin Township (TW); Huan-Ruei Shiu, Qionlin Township (TW); Chung-Liang Hsu, Qionlin Township (TW)

(73) Assignee: Gunitech Corp., Qionlin Township (TW)

( * ) Notice: Subject to any disclaimer, the term of this patent is extended or adjusted under 35 U.S.C. 154(b) by 82 days.

This patent is subject to a terminal disclaimer.

(21) Appl. No.: 17/159,588

(22) Filed: Jan. 27, 2021

(65) Prior Publication Data

US 2022/0167304 A1    May 26, 2022

(30) Foreign Application Priority Data

Nov. 26, 2020   (TW) .................................. 109141634

(51) Int. Cl.
*H04W 24/10* (2009.01)
*H04W 64/00* (2009.01)
*H04B 17/318* (2015.01)

(52) U.S. Cl.
CPC ........ *H04W 64/006* (2013.01); *H04B 17/318* (2015.01); *H04W 24/10* (2013.01)

(58) Field of Classification Search
CPC .. H04W 64/006; H04W 24/10; H04B 17/318; G01S 5/02213; G01S 5/0278; G01S 5/14; G01S 11/06
See application file for complete search history.

(56) References Cited

U.S. PATENT DOCUMENTS

| | | | |
|---|---|---|---|
| 2011/0205358 A1* | 8/2011 | Aota ........................ | G01S 19/23 348/143 |
| 2018/0213356 A1* | 7/2018 | Singamsetty ......... | G01S 5/0278 |
| 2020/0077273 A1* | 3/2020 | Cherian .............. | H04W 74/002 |

* cited by examiner

*Primary Examiner* — Chuong A Ngo
(74) *Attorney, Agent, or Firm* — Alan D. Kamrath; Karin L. Williams; Mayer & Williams PC (57) ABSTRACT

A two-way signal positioning method and a two-way signal positioning system thereof are disclosed. The method includes the following steps: controlling a locating device to be measured to transmit a plurality of positioning signals of a plurality of transmission powers; causing a plurality of known locating devices to receive the plurality of positioning signals and return a plurality of response signals to the locating device to be measured; recording the strengths of the plurality of positioning signals, the strengths of the plurality of response signals, the plurality of corresponding receiving times and the coordinates of the plurality of known locating devices to a database; identifying the known locating devices corresponding to the stronger signals; and obtaining a signal strength-distance function and a signal strength-distance standard deviation function from the database so as to identify the device location of the locating device to be measured.

16 Claims, 10 Drawing Sheets

TWO-WAY SIGNAL POSITIONING METHOD AND TWO-WAY SIGNAL POSITIONING SYSTEM THEREOF

BACKGROUND OF INVENTION

1. Field of the Invention

The present invention relates generally to a two-way signal positioning method and a two-way signal positioning system thereof, and more particularly to a two-way signal positioning method and a two-way signal positioning system thereof that conduct positioning through the transmission and reception of signals of different powers.

2. Description of Related Art

One of the most used conventional positioning methods for indoor devices is trilateration. The distances needed by trilateration are usually obtained through computation of strengths of signals or times of arrival (ToA). Therefore, the accuracy in the computations of strengths of signals or times of arrival will greatly affect the deduced distances and consequently affect the accuracy of the trilateration. In the prior art, the positioning only relies on a fixed power to transmit signals. As the positioning is based on signal transmissions using a fixed power, the accuracy of positioning is limited by the form of attenuation of the single-power signals.

Nowadays, mobile devices such as mobile phones are usually equipped with sensors of various functions. The combination of such sensors as gyroscopes or e-compasses can effectively promote and improve the accuracy of positioning. However, in consideration of costs, indoor positioning devices are unlikely to be equipped with various sensors. Without other auxiliary sensors, indoor positioning can rely on only the strengths of signals to deduce the distances and use the data of distances for positioning. However, in the prior art, the strengths of signals from Bluetooth devices may vary significantly, resulting in considerable positioning errors.

Therefore, there is a necessity to invent a new two-way signal positioning method and a two-way signal positioning system thereof to solve the problems existing in the prior art.

SUMMARY OF THE INVENTION

The main object of the present invention is to provide a two-way signal positioning method, which can achieve the effect of positioning through the transmission and reception of signals of different powers.

The other object of the present invention is to provide a two-way signal positioning system that uses the above method.

To accomplish the above objects, the two-way signal positioning method disclosed in the present invention is used for a two-way signal positioning system to identify a device location of a locating device to be measured in a specific space, the specific space including a plurality of known locating devices. The method includes the following steps: controlling a device to be measured to transmit a plurality of positioning signals of a plurality of transmission powers; causing a plurality of known locating devices to receive the plurality of positioning signals and return a plurality of response signals to the device to be measured; recording the strengths of the plurality of positioning signals, the strengths of the plurality of response signals, the plurality of corresponding receiving times and the coordinates of the plurality of known locating devices to a database; identifying the known locating devices corresponding to the stronger signals among the plurality of positioning signals received and the plurality of response signals; obtaining a signal strength-distance function and a signal strength-distance standard deviation function from the database; and identifying the device location of the locating device to be measured based on the signal strength-distance function and the signal strength-distance standard deviation function.

The two-way signal positioning system of the present invention includes a processing module, a database, and a computing module. The processing module is used for controlling a device to be measured to transmit a plurality of positioning signals of a plurality of transmission powers, and for causing a plurality of known locating devices to receive the plurality of positioning signals and return a plurality of response signals to the device to be measured. The database, electronically connected to the processing module, is for storing the signal strength-distance function and the signal strength-distance standard deviation function. After the plurality of known locating devices receive a plurality of positioning signals, the database will record the strengths of the plurality of positioning signals, the strengths of the plurality of response signals, the plurality of corresponding receiving times, and the coordinates of the plurality of known locating devices. Thus, the processing module can identify the known locating devices corresponding to the stronger signals among the plurality of positioning signals received. The computing module, which is electronically connected to the database, is used to inquire the signal strength-distance function and the signal strength-distance standard deviation function to identify the device location of the locating device to be measured on the basis of the strengths of the plurality of positioning signals, the strengths of the plurality of response signals, the plurality of corresponding receiving times and the known locating devices corresponding to the stronger signals.

DETAILED DESCRIPTION OF THE INVENTION

In order for your esteemed auditors to better understand the technical contents of the present invention, detailed descriptions are provided below with reference to preferred embodiments as examples.

Figure 1:
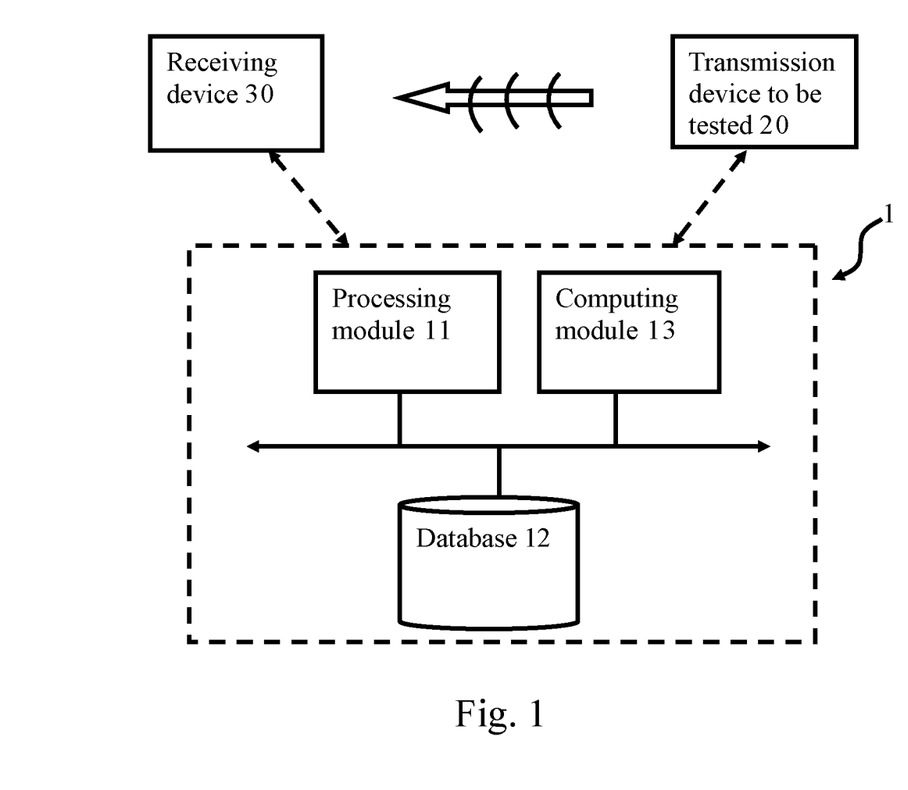
FIG. 1 is a system construction diagram showing settings of the two-way signal positioning system of the present invention.

First, please refer to FIG. 1, which is a system construction diagram showing settings of the two-way signal positioning system of the present invention.

Figure 3:
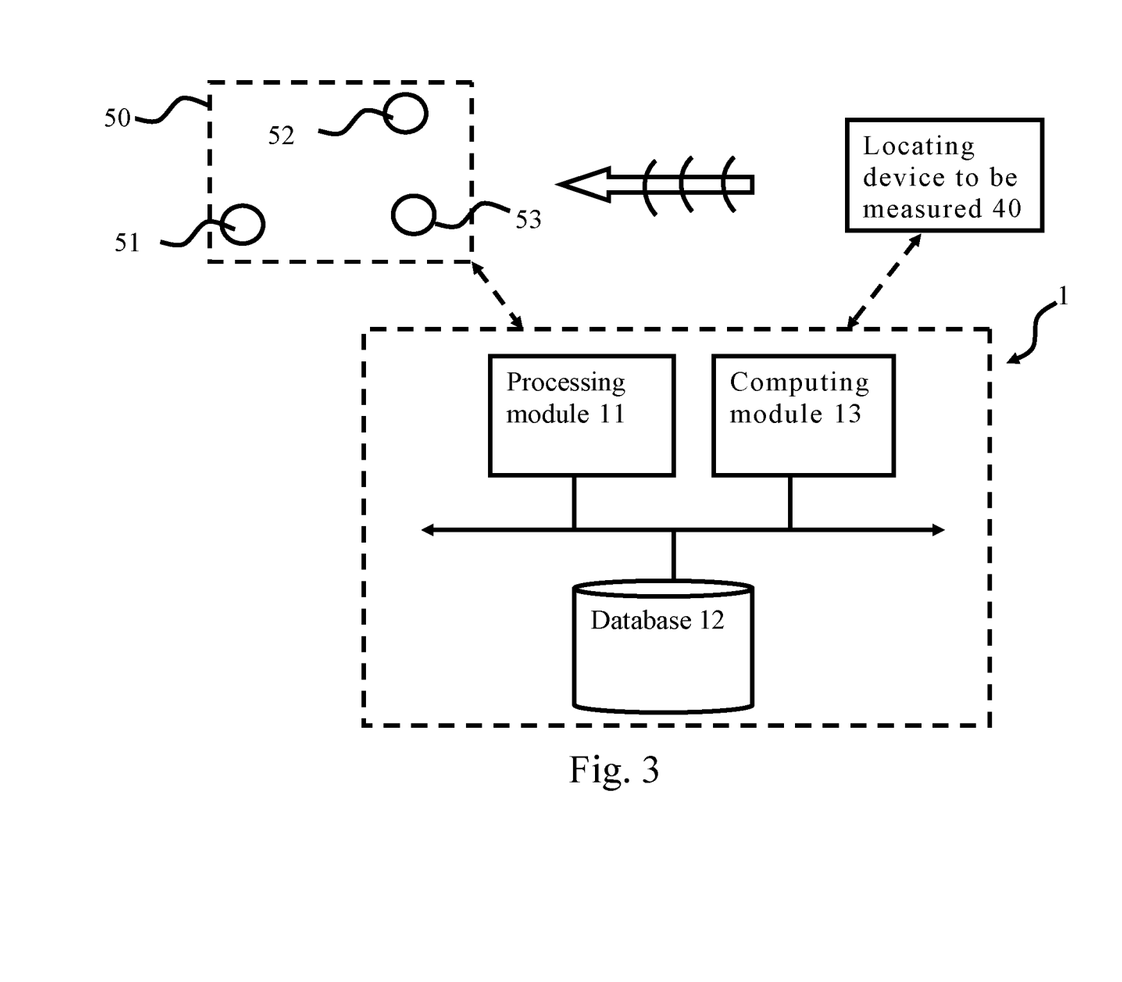
FIG. 3 is a system construction diagram showing the positioning of the two-way signal positioning system of the present invention.

In one embodiment of the present invention, the two-way signal positioning system 1 includes a processing module 11, a database 12, and a computing module 13, electronically connected to one another. The two-way signal positioning system 1 is used to identify the location of a locating device to be measured 40 in a specific space using known locating devices 50 (as shown in FIG. 3). Before identifying the locating device to be measured 40, the two-way signal positioning system 1 can also create the data needed for the signal strength-distance function and the signal strength-distance standard deviation function using the transmission device to be tested 20 and the receiving device 30, but the present invention is not limited to this. In the system, the transmission device to be tested 20, the receiving device 30, the locating device to be measured 40, and the known locating devices 50 can all send and receive wireless signals. The wireless signals can be Bluetooth signals. The transmission device to be tested 20, the receiving device 30, the locating device to be measured 40, and the known locating devices 50 can also be identical or different household appliances, computer devices or mobile devices, but the present invention is not limited to this.

It is to be noted that the various modules existing in the two-way signal positioning system 1 can be constructed of hardware devices, a combination of software applications and hardware devices, or a combination of firmware and hardware devices. For example, a computer program product can be stored in a computer-accessible medium for reading and execution to accomplish the various functions of the present invention, but the present invention is not limited to the above method. Also, it is to be noted that the present embodiment is just an example of preferred embodiments of the present invention, and to avoid superfluous descriptions, not all possible variations or combinations are described herein. However, it can be readily understood by those skilled in the art that each of the above modules or components may not be necessary. For implementation of the present invention, other specific prior-art modules or components may be included. All modules or components can be omitted or modified as needed, and there may be other modules or components between any two modules. The processing module 11, database 12 or computing module 13 can be configured in the same device or in different devices, or they can be configured in any one of the transmission device to be tested 20, the receiving device 30, the locating device to be measured 40, or the known locating devices 50, but the present invention is not limited to this.

In one embodiment of the present invention, the processing module 11 is for setting the plurality of transmission powers for the transmission device to be tested 20 so that the transmission device to be tested 20 can transmit a plurality of testing signals. Then the receiving device 30 receives the plurality of testing signals at a plurality of corresponding distances from the transmission device to be tested 20. For example, at different distances such as 10 cm or 20 cm, or different distances from 1 m to 6 m, different testing signals are transmitted with different transmission powers, but the present invention is not limited to these values. In this way, the processing module 11 detects the strengths of the plurality of testing signals received by the receiving device 30 and records the strengths of the plurality of testing signals and the plurality of corresponding distances to the database 12. In the end, the computing module 13 computes the data values in the database 12 and obtains the signal strength-distance function and the signal strength-distance standard deviation function and stores them in the database 12.

Figure 2:
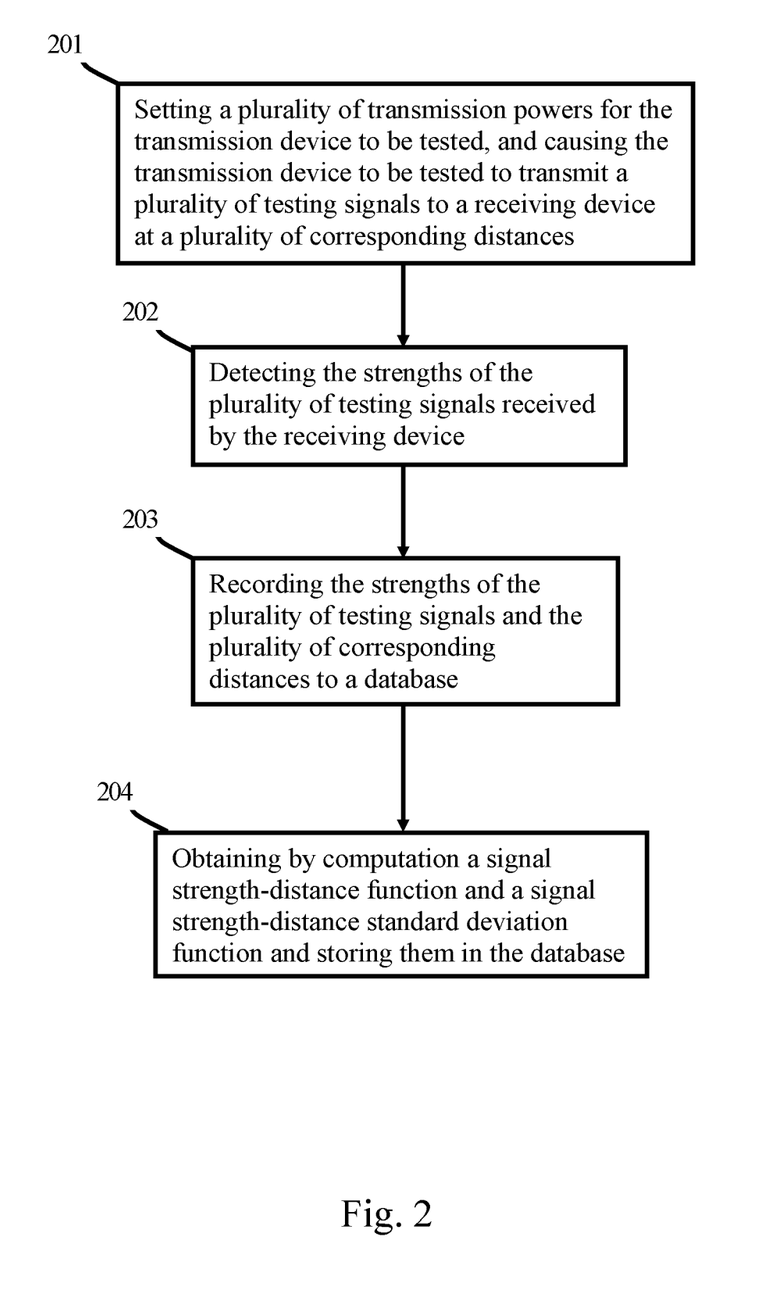
FIG. 2 is a flowchart of the steps of the data setting process of the present invention.

Next, please refer to FIG. 2 for a flowchart of the steps of the data setting process of the present invention. It should be noted here that although the two-way signal positioning system 1 described above is employed as an example to illustrate the data setting process of the present invention, the data setting process of the present invention is not limited to a two-way signal positioning system 1 using the same structure as described above.

First, the process executes Step 201: Setting a plurality of transmission powers for the transmission device to be tested, and causing the transmission device to be tested to transmit a plurality of testing signals to a receiving device at a plurality of corresponding distances.

The processing module 11 sets the plurality of transmission powers for the transmission device to be tested 20. Thus, the transmission device to be tested 20 can transmit a plurality of testing signals. Then the receiving device 30 receives the plurality of testing signals at a plurality of corresponding distances from the transmission device to be tested 20, such as 10 cm, 20 cm, or different distances from 1 m to 6 m.

Then the process executes Step 202: Detecting the strengths of the plurality of testing signals received by the receiving device.

The processing module 11 detects the signal strengths of all signals received by the receiving device 30.

Then follows Step 203: Recording the strengths of the plurality of testing signals and the plurality of corresponding distances to a database.

The processing module 11 stores the signal strengths of all the testing signals received by the receiving device 30 and the distances corresponding to the testing signals in the database 12.

Finally, the process executes Step 204: Obtaining by computation a signal strength-distance function and a signal strength-distance standard deviation function and storing them in the database.

The computing module 13 computes the above-mentioned signal strengths of all the signals and the corresponding distances and obtains the signal strength-distance function and the signal strength-distance standard deviation function for each different transmission power, and it then deduces the correlation between the strengths of the signals received by the receiving device 30 and the transmission device to be tested 20 and its standard deviation. The data are then stored in the database 12. At this point, the data setting process of the present invention is completed.

Please refer to FIG. 3 for a system construction diagram showing the positioning of the two-way signal positioning system of the present invention.

After the creation of the signal strength-distance function and the signal strength-distance standard deviation function in the database 12, the two-way signal positioning system 1 can use the known locating devices 50 to identify a device location of a locating device to be measured 40 in a specific space. It is to be noted that, although in one embodiment of the present invention, the signal strength-distance function and the signal strength-distance standard deviation function is obtained through an initial direct data setting process, the present invention is not limited to executing the data setting process each time to recreate the signal strength-distance function and the signal strength-distance standard deviation function in the database 12. The signal strength-distance function and signal strength-distance standard deviation function can be preset in the locating device to be measured 40 or the known locating devices 50.

In this way, the processing module 11 can control the locating device to be measured 40 to transmit a plurality of positioning signals of a plurality of transmission powers and cause the plurality of known locating devices 50 to receive the plurality of positioning signals and then cause the plurality of known locating devices 50 to send back a plurality of response signals to the locating device to be measured 40. The processing module 11 can record the strengths of the plurality of positioning signals, the strengths of the plurality of response signals, the plurality of corresponding receiving times and the locations of a plurality of known locating devices 50 to the database 12. The plurality of known locating devices 50 will also receive an identification code of the locating device to be measured 40 for identification of the locating device to be measured 40. This identification code will also be stored in the database 12. In this way, the processing module 11 identifies the devices corresponding to the stronger signals among the plurality of positioning signals received and the plurality of response signals, such as the known locating devices 51, 52, 53. Finally, the computing module 13 can identify the device location of the locating device to be measured 40 based on the locations of the known locating devices 51, 52, 53 and the signal strength-distance function and the signal strength-distance standard deviation function.

Figure 4:
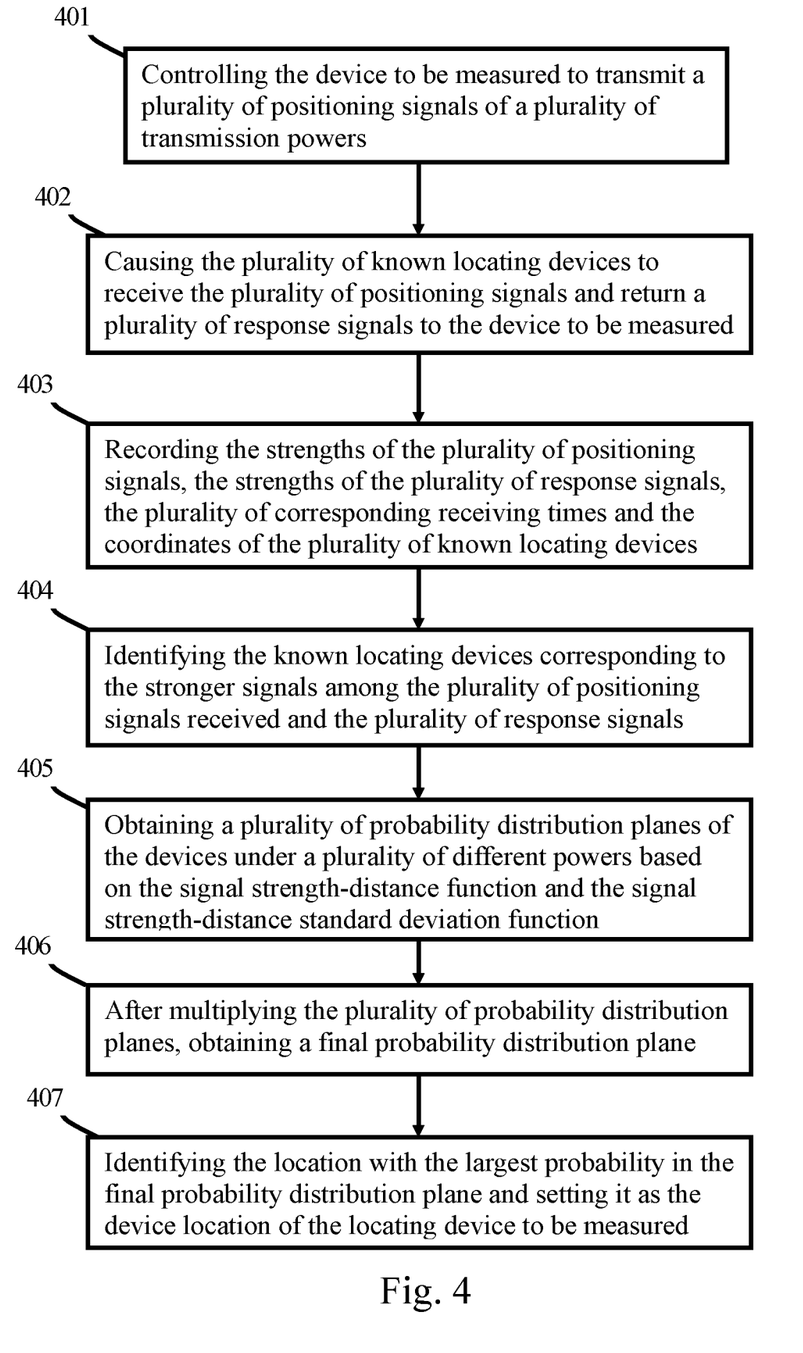
FIG. 4 is a flowchart of the steps of the first embodiment of a two-way signal positioning method of the present invention.

As regards the detailed method for identifying the device location of the locating device to be measured 40, please refer to FIG. 4, which is a flowchart of the steps of the first embodiment of the device positioning process according to the present invention.

First, the process executes Step 401: Controlling the device to be measured to transmit a plurality of positioning signals of a plurality of transmission powers.

When a locating device to be measured 40 enters a specific space, the processing module 11 must first control the locating device to be measured 40 to transmit positioning signals with different transmission powers.

Then the process executes Step 402: Causing the plurality of known locating devices to receive the plurality of positioning signals and return a plurality of response signals to the device to be measured.

In this step, the different known locating devices 50 receive the positioning signals of the locating device to be measured 40. The processing module 11 then controls the different known locating devices 50 to send back a plurality of response signals to the locating device to be measured 40. Now, the plurality of known locating devices 50 will also receive an identification code of the locating device to be measured 40.

Further, the process executes Step 403: Recording the strengths of the plurality of positioning signals, the strengths of the plurality of response signals, the plurality of corresponding receiving times and the coordinates of the plurality of known locating devices.

Since the locating device to be measured 40 transmits positioning signals with different transmission powers, then after the known locating devices 50 receive the positioning signals and send back response signals, the known locating devices 50 will send back data of all positioning signals, the corresponding receiving times and the coordinates of the known locating devices 50 to the database 12, and the locating device to be measured 40 will send back data of all the response signals to the database 12.

Then follows Step 404: Identifying the known locating devices corresponding to the stronger signals among the plurality of positioning signals received and the plurality of response signals.

The processing module 11 will identify a plurality of positioning signals and the locating devices corresponding to the stronger signals among the plurality of response signals 51, 52, 53 from the data in the database 12.

Then the process executes Step 405: Obtaining a plurality of probability distribution planes of the devices under a plurality of different powers based on the signal strength-distance function and the signal strength-distance standard deviation function.

The computing module 13 can inquire the signal strength-distance function and the signal strength-distance standard deviation function based on the strengths of the plurality of positioning signals, the strengths of the plurality of response signals, the plurality of corresponding receiving times and the known locating devices corresponding to the stronger signals, and use the coordinates of the fixing points of the known locating devices 51, 52, 53 as circle centers to obtain the distance under this signal strength according to the signal strength-distance function. This distance is set as a basic radius. Then the signal strength-distance standard deviation function is used to obtain the distance standard deviation under this signal strength. This standard deviation is set as the basis for radius adjustment. In this way, a plurality of probability distribution planes for the known locating devices 51, 52, 53 under different powers can be calculated.

Figure 5:
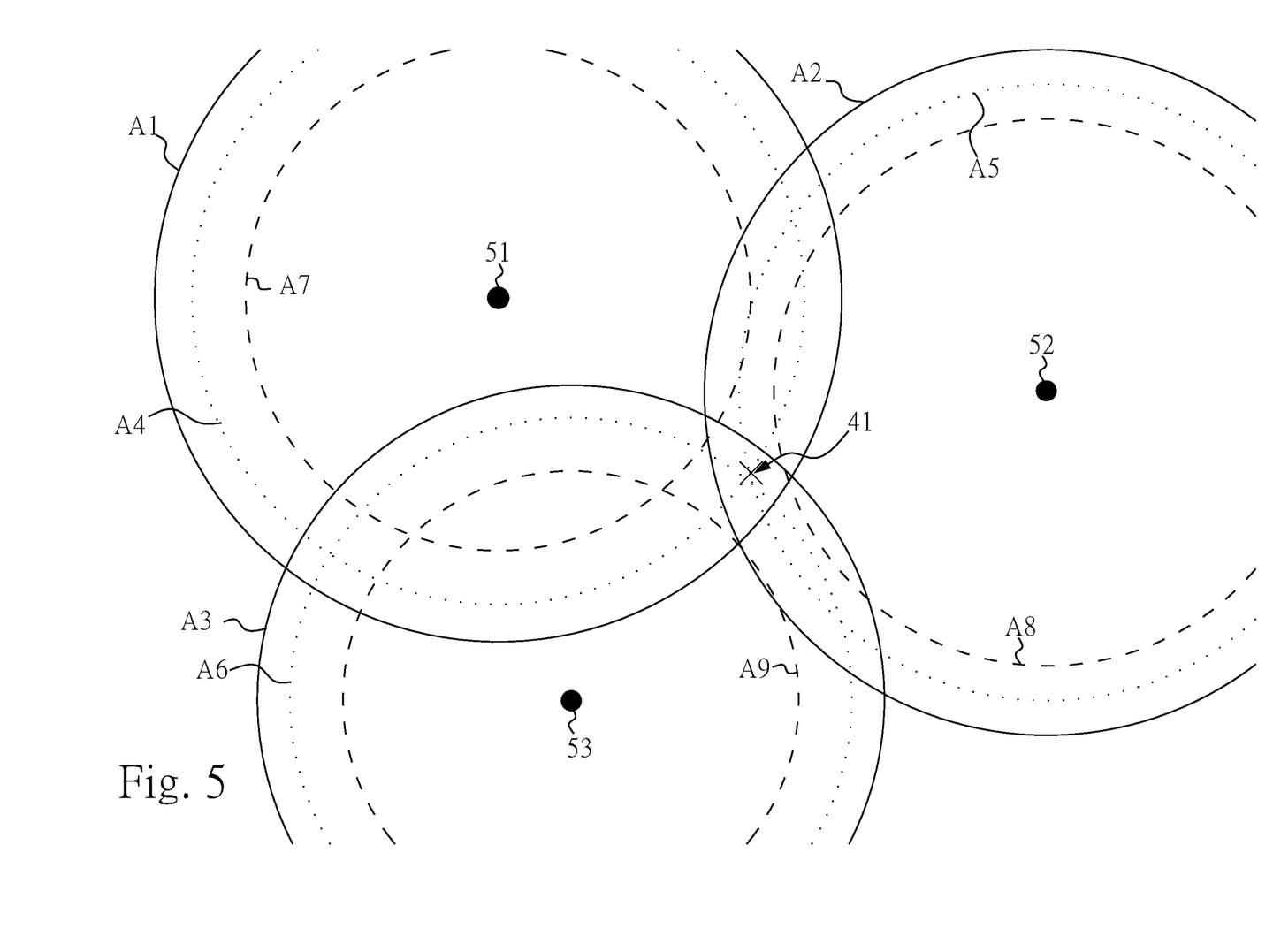
FIG. 5 is based on FIG. 4 and shows a schematic view of the probability distribution according to the first embodiment of a two-way signal positioning method of the present invention.

Please refer also to FIG. 5, which is based on FIG. 4 and shows a schematic view of the probability distribution according to the first embodiment of the device positioning process according to the present invention.

In this embodiment, under high, medium and low powers, 9 probability distribution planes can be obtained from the positioning signals received by the known locating devices 51, 52, 53, and 9 probability distribution planes can also be obtained from the response signals. FIG. 5 uses only the 9 probability distribution planes obtained from the positioning signals received by the known locating devices 51, 52, 53 as examples for the purpose of description. As shown in FIG. 5, under the high power, the probability distribution planes A1, A2, A3 can be obtained from the positioning signals received by the known locating devices 51, 52, 53; under the medium power, the probability distribution planes A4, A5, A6 can be obtained from the positioning signals received by the known locating devices 51, 52, 53; under the low power, the probability distribution planes A7, A8, A9 can be obtained from the positioning signals received by the known locating devices 51, 52, 53.

The process continues with Step 406: After multiplying the plurality of probability distribution planes, obtaining a final probability distribution plane.

Then the computing module 13 multiplies the obtained probability distribution planes A1 to A9 and obtains the final probability distribution plane.

Last, the process executes Step 407: Identifying the location with the largest probability in the final probability distribution plane and setting it as the device location of the locating device to be measured.

Finally, the computing module 13 identifies the location with the largest probability in the probability distribution planes and sets the location with the largest probability as the device location 41 of the locating device to be measured 40, thereby obtaining the coordinates of the locating device to be measured 40.

Figure 6:
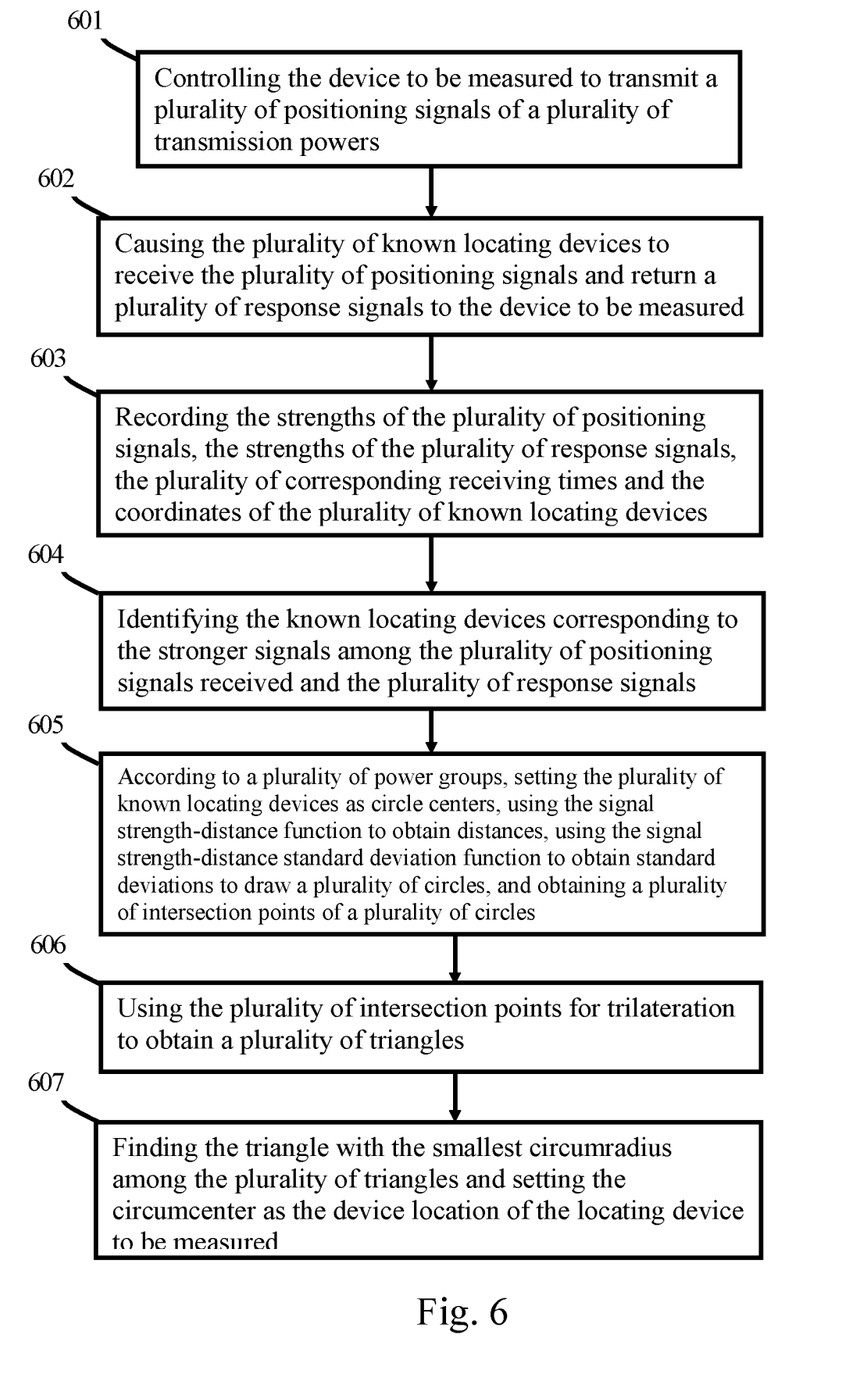
FIG. 6 is a flowchart of the steps of a second embodiment of a two-way signal positioning method of the present invention.

Please refer to FIG. 6 for a flowchart of the steps of the second embodiment of the device positioning process according to the present invention.

First, the process executes Step 601: Controlling the device to be measured to transmit a plurality of positioning signals of a plurality of transmission powers. The process further executes Step 602: Causing the plurality of known locating devices to receive the plurality of positioning signals and return a plurality of response signals to the device to be measured. The process continues with Step 603: Recording the strengths of the plurality of positioning signals, the strengths of the plurality of response signals, the plurality of corresponding receiving times and the coordinates of the plurality of known locating devices, and Step 604: Identifying the known locating devices corresponding to the stronger signals among the plurality of positioning signals received and the plurality of response signals.

As the techniques of the above Step 601 to Step 604 are identical to those of Step 401 to Step 404, the details are not repeated herein.

Then the process executes Step 605: According to a plurality of power groups, setting the plurality of known locating devices as circle centers, using the signal strength-distance function to obtain distances, using the signal strength-distance standard deviation function to obtain standard deviations to draw a plurality of circles, and obtaining a plurality of intersection points of a plurality of circles.

Further, the computing module 13 can, based on the strengths of the plurality of positioning signals, the strengths of the plurality of response signals, the plurality of corresponding receiving times and the known locating devices corresponding to the stronger signals, inquire the signal strength-distance function and the signal strength-distance standard deviation function and then group the known locating devices transmitting signals of different powers. Under the same power, the positioning signals and response signals with the highest strengths detected by the locating device to be measured 40 may be transmitted by the same known locating device. Therefore, under the same power, only one coordinate is maintained as the circle center. Thus, in this embodiment, under high, medium and low powers, a maximum of 18 coordinates and a minimum of 9 coordinates of the known locating devices can be obtained. Then the signal strength-distance function is used to obtain the distance corresponding to this signal strength, and this distance is set as the basic radius. Then the signal strength-distance standard deviation function is used to obtain the distance standard deviation corresponding to this signal strength and this standard deviation is set as the basis for adjustment of the radius.

Figure 7A:
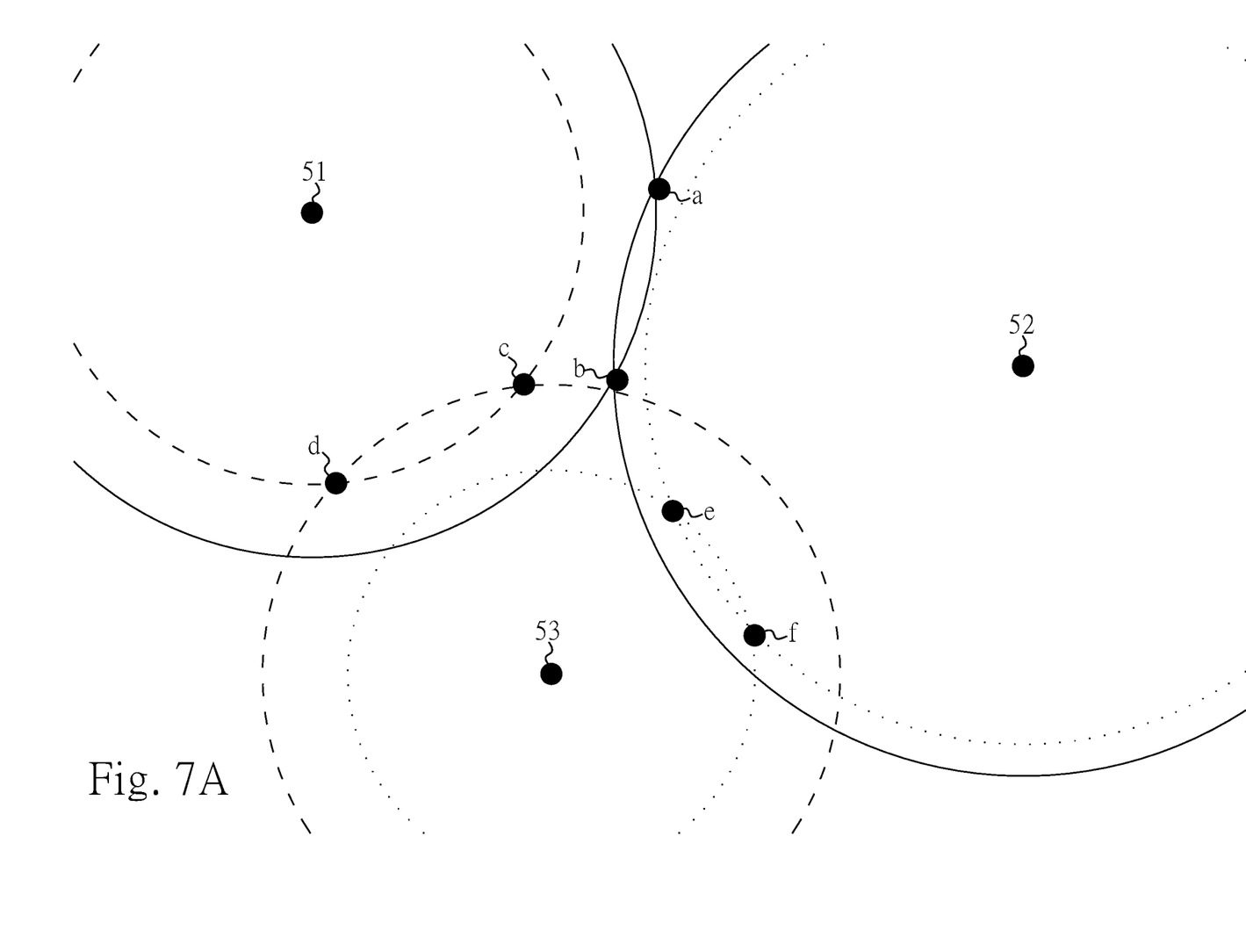
FIGS. 7A-7B are based on FIG. 6 and show the schematic view of the concentric circles in the second embodiment of a two-way signal positioning method of the present invention under different transmission powers.
Figure 7B:
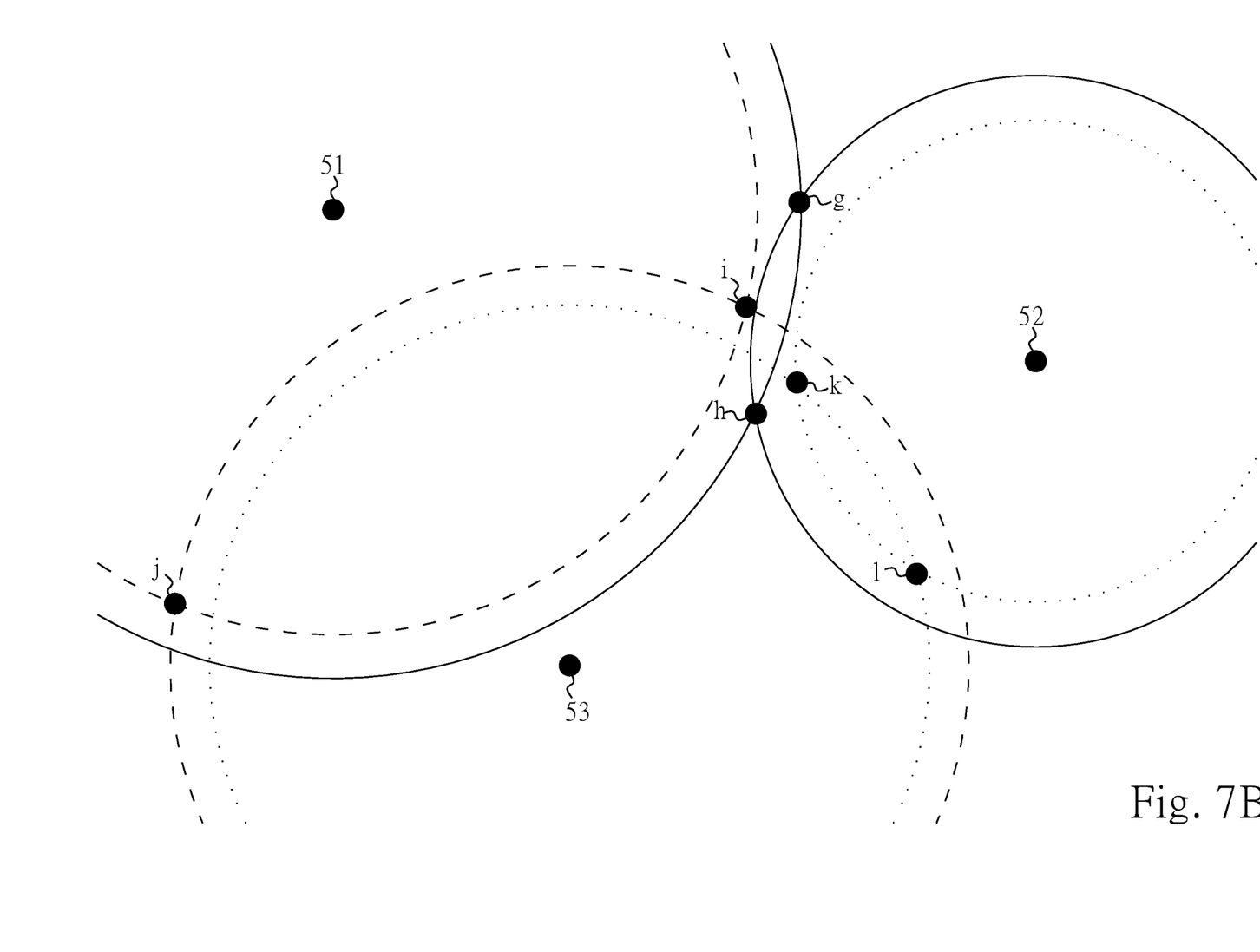

Please refer also to FIGS. 7A-7B, which are based on FIG. 6 and show a schematic view of the concentric circles under different transmission powers in the second embodiment of the device positioning process according to the present invention.

In FIGS. 7A-7B, the identification of coordinates of three known locating devices 51, 52, 53 is used as an example for the purpose of description, but the present invention is not limited to this number. Therefore, in the present invention, the coordinates of the fixed points of known locating devices 51, 52, 53 are used as circle centers to draw a plurality of circles and obtain intersection points based on each two fixed points. In FIG. 7A, first, the original radius reduced by 0.67 standard deviation is set as the minimum radius, and the original radius increased by 0.67 standard deviation is set as the maximum radius. If two circles intersect or are tangential to each other, the process ends. If there are no intersections between two circles, another 0.0134 (i.e., (0.67*2)/100) standard deviation is added until there are intersection points with another circle. In this way, a plurality of intersection points a to f between a plurality of circles can be obtained; i.e., the circles of the known locating devices 51, 52 have intersection points a, b; the circles of the known locating devices 51, 53 have intersection points c, d; and the circles of the known locating devices 52, 53 have intersection points e, f. In each group of powers, the circles centered on the fixed points of the known locating devices 51, 52, 53 can have a maximum of 6 intersection points, but the present invention is not limited to the necessity of 6 intersection points. FIG. 7B shows a schematic view of intersection points of circles centered on the known locating devices 51, 52, 53 computed under another power. Therefore, in FIG. 7B, 6 intersection points g to l can be obtained for the known locating devices 51, 52, 53 under another power.

Further, the process executes Step 606: Using the plurality of intersection points for trilateration to obtain a plurality of triangles.

Figure 7C:
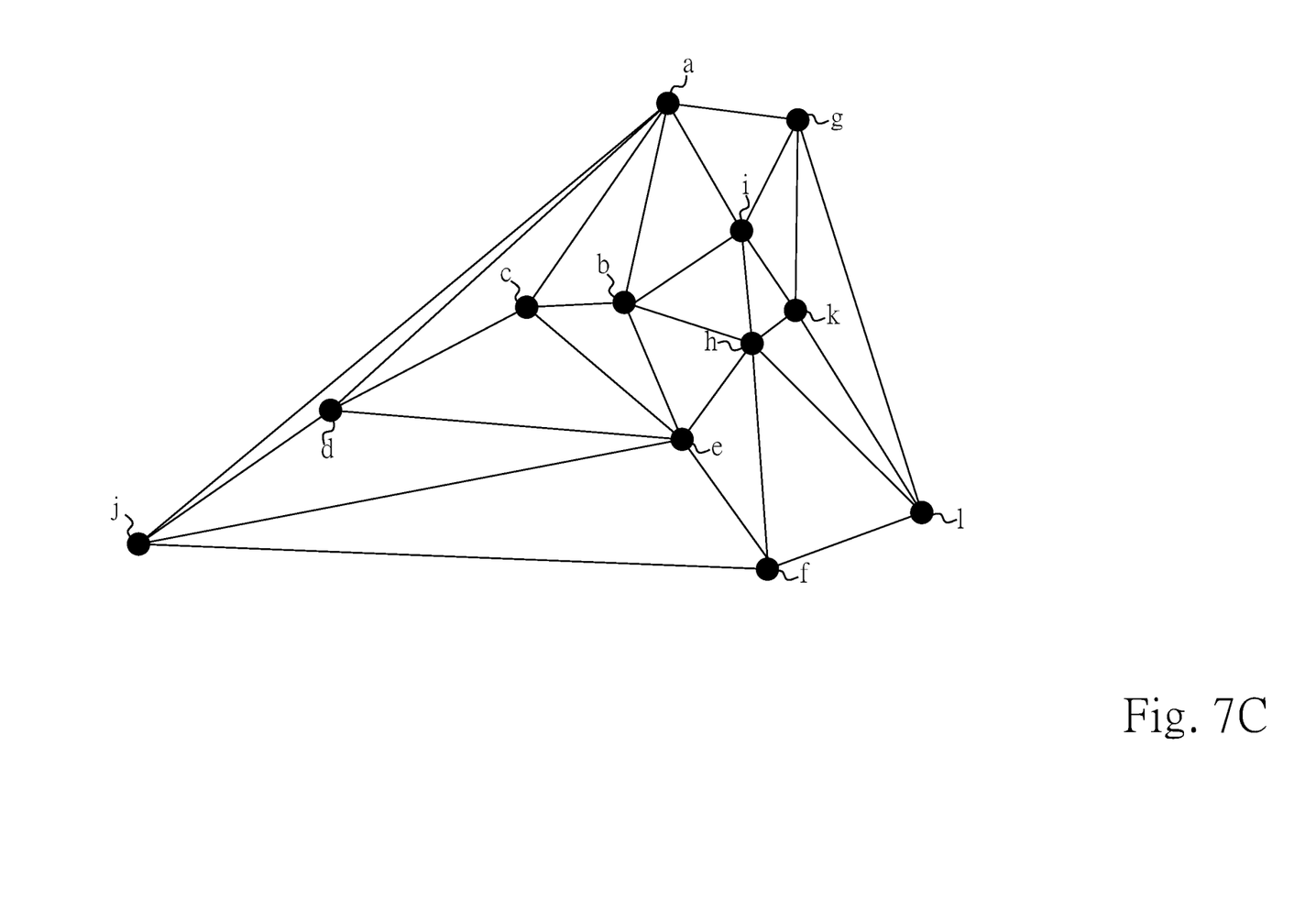
FIG. 7C is based on FIG. 6 and shows a schematic view of the triangulation of intersection points according to the second embodiment of a two-way signal positioning method of the present invention.

Please refer to FIG. 7C, which is based on FIG. 6 and shows the schematic view of the trilateration of the intersection points in the device positioning process of the second embodiment of the present invention.

After the removal of outliers for all the intersection points a to l, the computing module 13 conducts a Delaunay triangulation process to obtain a plurality of triangles. In the present embodiment, it is assumed that 12 intersection points a to l are obtained and computed, but the present invention is not limited to this. When more coordinates are identified, more intersection points can be obtained, and with more intersection points, more accurate results can be obtained.

Last, the process executes Step 607: Finding the triangle with the smallest circumradius among the plurality of triangles and setting the circumcenter as the device location of the locating device to be measured.

Figure 7D:
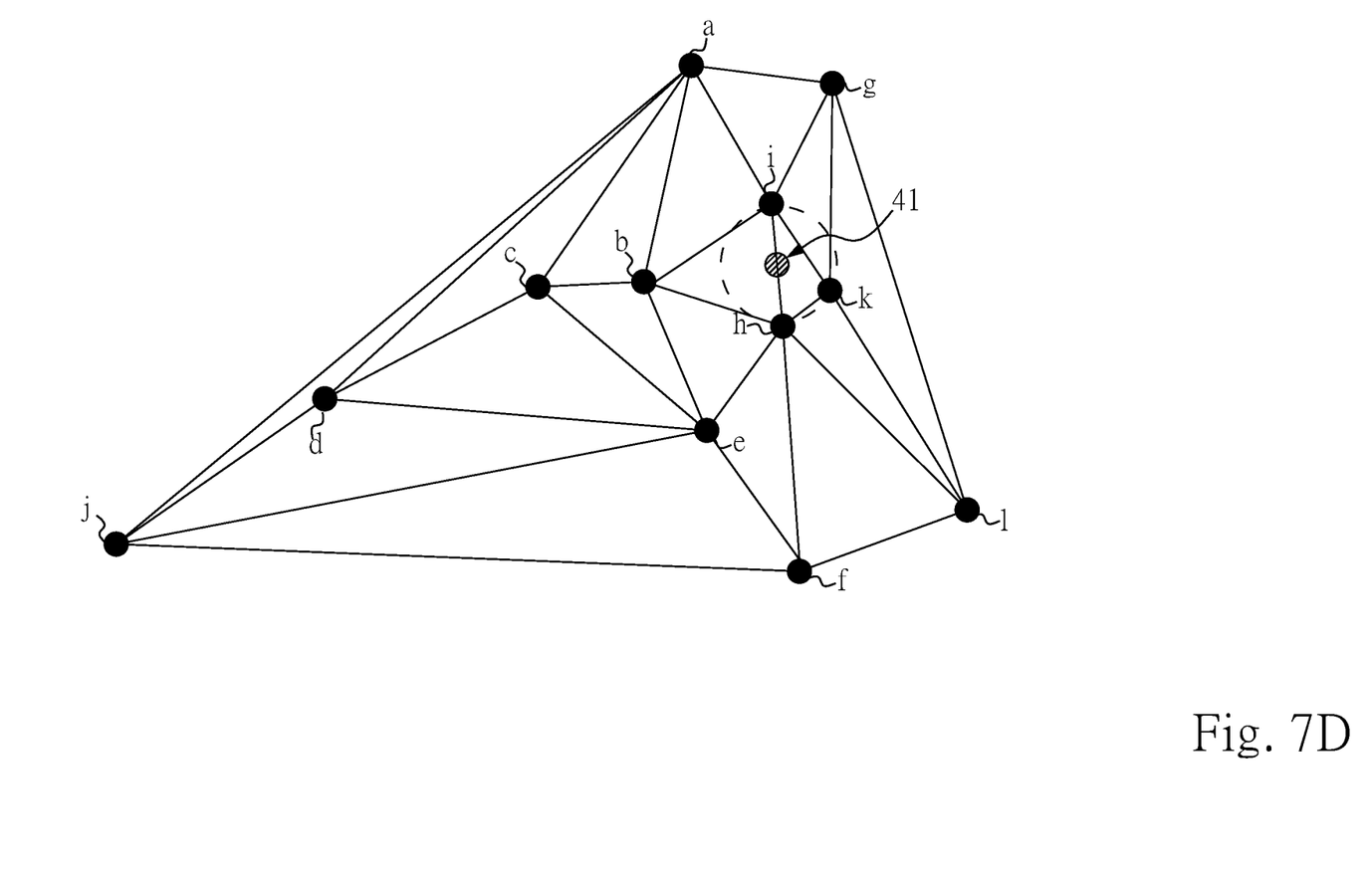
FIG. 7D is based on FIG. 6 and shows a schematic view of identifying the smallest concentric circle according to the second embodiment of a two-way signal positioning method of the present invention.

Please refer to FIG. 7D, which is based on FIG. 6 and shows a schematic view of identification of the smallest concentric circle in the device positioning process of the second embodiment according to the present invention.

Finally, the computing module 13 further finds the circumcenter of the triangle with the smallest circumradius. The center of the smallest circumcircle is set as device location 41 of the locating device to be measured 40, and thus the coordinates of the locating device to be measured 40 are known. For example, in FIG. 7D, the triangle formed by the intersection points i, h, k is the triangle with the smallest circumradius. Therefore, the coordinates of its circumcenter define the device location 41.

It is to be noted that the two-way signal positioning method disclosed in the present invention is not limited to the above-mentioned sequence of steps. As long as the object of the present invention can be accomplished, the above sequence of steps can be modified.

Through the two-way signal positioning method and two-way signal positioning system 1 thereof disclosed in the present invention, the location of the locating device to be measured 40 can be effectively identified, without the need to equip additional sensors.

To conclude, the present invention differs substantially from the characteristics of the prior art in all aspects of objects, means and efficacies. Therefore, we will be very appreciative if your esteemed auditors can review and approve our application for a patent as soon as possible to bring a benefit to our society. Although the present invention has been explained in relation to its preferred embodiment, it is to be understood that many other possible modifications and variations can be made without departing from the spirit and scope of the present invention as hereinafter claimed.

What is claimed is:

1. A two-way signal positioning method, used by a two-way signal positioning system to identify a device location of a locating device to be measured in a specific space, the specific space including a plurality of known locating devices, and the method including the following steps:
    controlling the device to be measured to transmit a plurality of positioning signals of a plurality of transmission powers;
    causing the plurality of known locating devices to receive the plurality of positioning signals and return a plurality of response signals to the device to be measured;
    recording the strengths of the plurality of positioning signals, the strengths of the plurality of response signals, the plurality of corresponding receiving times and the coordinates of the plurality of known locating devices to a database;
    identifying the known locating devices corresponding to the stronger signals among the plurality of positioning signals received and the plurality of response signals;
    obtaining a signal strength-distance function and a signal strength-distance standard deviation function from the database; and
    identifying the device location of the locating device to be measured based on the signal strength-distance function and the signal strength-distance standard deviation function.

2. The two-way signal positioning method as claimed in claim 1, which further includes the following steps:
    based on the signal strength-distance function and the signal strength-distance standard deviation function, identifying the plurality of known locating devices corresponding to the stronger signals and obtaining a plurality of probability distribution planes of the devices under a plurality of different powers;
    after multiplying the plurality of probability distribution planes, obtaining a final probability distribution plane; and
    identifying the location with the largest probability in the final probability distribution plane and setting it as the device location of the locating device to be measured.

3. The two-way signal positioning method as claimed in claim 2, which further includes a step to identify three known locating devices with stronger positioning signals and three known locating devices with stronger response signals.

4. The two-way signal positioning method as claimed in claim 1, which further includes the following steps:
    based on the signal strength-distance function and the signal strength-distance standard deviation function, identifying the plurality of known locating devices corresponding to the stronger signals under different powers;
    according to a plurality of power groups, setting the plurality of known locating devices as circle centers and using the signal strength-distance function to obtain the distances, and using the signal strength-distance standard deviation function to obtain the standard deviation to draw a plurality of circles;
    obtaining a plurality of intersection points of a plurality of circles;
    using the plurality of intersection points for a trilateration process to obtain a plurality of triangles; and
    finding the triangle with the smallest circumradius among the plurality of triangles and setting the circumcenter as the device location of the locating device to be measured.

5. The two-way signal positioning method as claimed in claim 4, which further includes a step to identify three known locating devices with stronger positioning signals and three known locating devices with stronger response signals.

6. The two-way signal positioning method as claimed in claim 1, which further includes a step to identify three known locating devices with stronger positioning signals and three known locating devices with stronger response signals.

7. The two-way signal positioning method as claimed in claim 1, which further includes executing a step of receiving an identification code for the locating device to be measured.

8. The two-way signal positioning method as claimed in claim 1, which further includes executing a step of a data setting process, the data setting process including:
    setting a plurality of transmission powers for a transmission device to be tested, and causing the transmission device to be tested to transmit a plurality of testing signals to a receiving device at a plurality of corresponding distances, wherein different testing signals correspond to different transmission powers;
    detecting the strengths of the plurality of testing signals received by the receiving device;
    recording the strengths of the plurality of testing signals and the plurality of corresponding distances to a database; and
    obtaining by computation the signal strength-distance function and the signal strength-distance standard deviation function and storing them in the database.

9. A two-way signal positioning system, used to identify a device location of a locating device to be measured in a specific space, the specific space including a plurality of known locating devices, and the two-way signal positioning system including:
    a processing module, for controlling the device to be measured to transmit a plurality of positioning signals of a plurality of transmission powers, causing the plurality of known locating devices to receive the plurality of positioning signals and return a plurality of response signals to the device to be measured;
    a database, electronically connected to the processing module, for storing a signal strength-distance function and a signal strength-distance standard deviation function; after the plurality of known locating devices receive the plurality of positioning signals, the database is used for recording the strengths of the plurality of positioning signals, the strengths of the plurality of response signals, the plurality of corresponding receiving times and the coordinates of the plurality of known locating devices; thus, the processing module is used for identifying the known locating devices corresponding to the stronger signals among the plurality of positioning signals received and the plurality of response signals; and a computing module, electronically connected to the database, used to inquire the signal strength-distance function and the signal strength-distance standard deviation function based on the strengths of the plurality of positioning signals, the strengths of the plurality of response signals, the plurality of corresponding receiving times and the known locating devices corresponding to the stronger signals, to identify the device location of the locating device to be measured.

10. The two-way signal positioning system as claimed in claim 9, wherein the processing module is used for identifying the plurality of known locating devices with stronger signals based on the signal strength-distance function and the signal strength-distance standard deviation function and obtaining a plurality of probability distribution planes of the devices under a plurality of different powers; thus, the computing module multiplies the plurality of probability distribution planes to obtain a final probability distribution plane, finds the location with the largest probability in the final probability distribution plane, and sets it as the device location of the locating device to be measured.

11. The two-way signal positioning system as claimed in claim 10, wherein the processing module is used for identifying three known locating devices with stronger positioning signals and three locating devices with stronger response signals.

12. The two-way signal positioning system as claimed in claim 9, wherein the processing module is used for identifying the plurality of known locating devices with stronger signals under different powers, based on the signal strength-distance function and the signal strength-distance standard deviation function; according to a plurality of power groups, the processing module sets the plurality of known locating devices as circle centers, uses the signal strength-distance function to obtain the distances, and uses the signal strength-distance standard deviation function to obtain the standard deviation to draw a plurality of circles, and finally obtains a plurality of intersection points of the plurality of circles; thus, the computing module conducts a trilateration process for the plurality of intersection points to find the circumcenter of the triangle with smallest circumradius and sets it as the device location of the locating device to be measured.

13. The two-way signal positioning system as claimed in claim 12, wherein the processing module is used for identifying three known locating devices with stronger positioning signals and three locating devices with stronger response signals.

14. The two-way signal positioning system as claimed in claim 9, wherein the processing module is used for identifying three known locating devices with stronger positioning signals and three locating devices with stronger response signals.

15. The two-way signal positioning system as claimed in claim 9, which includes reception of an identification code for the locating device to be measured.

16. The two-way signal positioning system as claimed in claim 9, wherein the processing module is used for setting a plurality of transmission powers for a transmission device to be tested to transmit a plurality of testing signals, causing a receiving device to receive the plurality of testing signals at a plurality of corresponding distances from the transmission device to be tested, wherein different testing signals correspond to different transmission powers; thus, the processing module detects the strengths of the plurality of testing signals received by the receiving device and records the strengths of the plurality of testing signals and the plurality of corresponding distances to a database so that the computing module can compute and obtain the signal strength-distance function and the signal strength-distance standard deviation function and store them in the database.

\* \* \* \* \*